United States Patent [19]

Inoue et al.

[11] Patent Number: 5,353,882
[45] Date of Patent: Oct. 11, 1994

[54] SCREWING APPARATUS

[75] Inventors: Hiroyuki Inoue, Uji; Keiji Fujiwara, Hirakata; Tomomi Ogawa, Kofu; Masumi Tezuka, Yamanashi, all of Japan

[73] Assignee: Matsushita Electric Industrial Co., Ltd., Kadoma, Japan

[21] Appl. No.: 168,361

[22] Filed: Dec. 17, 1993

[30] Foreign Application Priority Data

Dec. 18, 1992 [JP] Japan .................. 4-338197

[51] Int. Cl.$^5$ ............................... B25B 23/14
[52] U.S. Cl. .................. 173/176; 81/469; 73/862.23
[58] Field of Search ............. 173/2, 4, 5, 176, 178, 173/179; 81/469, 467; 73/862.23

[56] References Cited

U.S. PATENT DOCUMENTS

| | | | |
|---|---|---|---|
| 4,554,980 | 11/1985 | Doniwa | 173/176 |
| 4,562,389 | 12/1985 | Jundt et al. | 81/469 |
| 4,858,312 | 8/1989 | Van Naarden | 81/467 |
| 5,004,054 | 4/1991 | Sheen | 173/178 |
| 5,154,242 | 10/1992 | Soshin | 173/178 |
| 5,203,242 | 4/1993 | Hansson | 81/469 |

*Primary Examiner*—Scott A. Smith
*Attorney, Agent, or Firm*—Wenderoth, Lind & Ponack

[57] ABSTRACT

A screwing apparatus includes a multi-phase motor and a control device. The motor rotates a bit, installed on the motor, for rotating a screw. The control device controls a rotational speed of the motor by calculating a rotational speed of the bit based on commutation signals outputted from sensors installed on the motor, and controls a torque value of the bit by outputting instructions to the motor so that the bit is rotated at a predetermined torque value.

8 Claims, 7 Drawing Sheets

SCREWING APPARATUS

BACKGROUND OF THE INVENTION

The present invention relates to a screwing apparatus for screwing parts to each other by means of screws in an assembling process.

There are demands for the development of a screwing apparatus, installed on robots or provided in assembling processes, which can be automatically operated by a rigid quality control procedure. In particular, in the control of the torque in a screwing operation, a standard fastening torque is provided by the industrial standard, depending on the diameter of a screw and the material of the parts to be fastened. In an assembling process, it is necessary to examine whether or not parts have been screw-fastened at an appropriate fastening torque. But the number of portions to be screw-fastened is so great that it is,difficult to inspect all of them. Therefore, sampling inspections are performed to check whether it is possible to tighten screws by means of a torque wrench or a torque driver. In fastening parts with screws at an appropriate torque, voltage-driving type drivers or current-driving type drivers are utilized to control the rotational force of a bit installed on a motor so as to fasten parts with screws at an appropriate torque.

Figure 5:
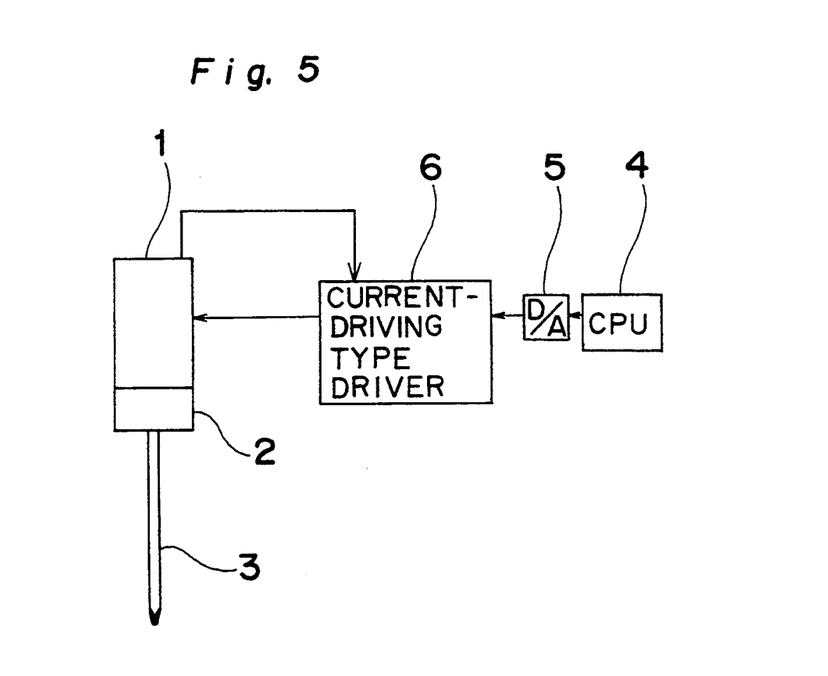
FIG. 5 is a block diagram showing the construction of a conventional screwing apparatus.

Referring to FIG. 5, the construction of a conventional screwing apparatus is described below. The screwing apparatus incorporating a brushless motor, is provided with a speed reducer 2 at the bottom thereof. The rotational speed of the brushless motor is reduced by the reducer 2 and the reduced speed thereof is transmitted to a bit 3 so as to rotate a screw 10 (not shown) installed at the lower end of the bit 3. The brushless motor is connected to a current-driving type driver 6 connected to a central processing unit (CPU) 4 via a D/A converter 5. Based on the torque set by the CPU 4, the current-driving type driver 6 drives the brushless motor by controlling the amplitude of the electric current.

Figure 6:
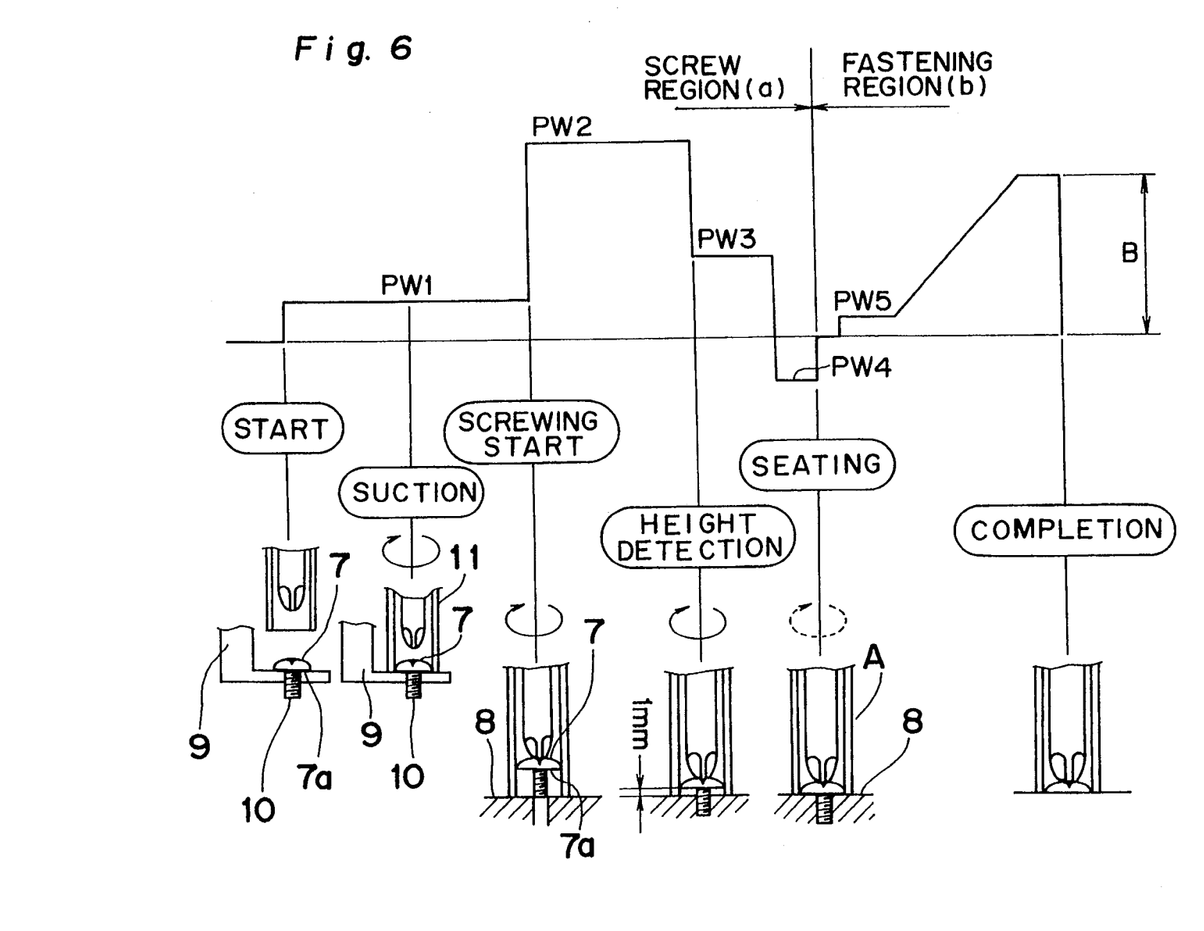
FIG. 6 is a view showing a screwing process of one cycle to be carried out by the screwing apparatus shown in FIG. 5.

The operation of the screwing apparatus having the above-described construction is described below with reference to FIG. 6. The screwing process comprises a screwing region (a) between the start of a screwing operation and a seating state (A) in which a seating surface 7a of a screw head 7 is brought into contact with a workpiece 8; and a fastening region (b) between the seating state (A) and the state in which the screw 10 is fastened at the target fastening torque (B). In a screw-sucking operation to be performed in the screwing region (a), the CPU 4 issues an instruction of a screw-sucking torque value PW1 which is a torque limit set in a low-speed rotation of the brushless motor between the state in which the screw 10 is set on a catcher 9 at a predetermined position thereof and the state in which the screw 10 is sucked by a sucking pipe 11 moved downward to cover the screw head 7 set on the catcher 9. Normally, the screw-sucking torque value PW1 is set to about 2 Kgfcm. A screwing torque value PW2 is a torque limit set in a high-speed rotation of the brushless motor in a screwing operation. The screwing torque value PW2 is set to be greater than the target fastening torque (B) in view of the kind of the screw 10 and the workpiece 8 and the screwing state so as to prevent the generation of a motor locking error in the screwing operation. A seating torque value PW3 is used between the state in which the screw 10 is positioned at a predetermined height 1 mm above the surface of the workpiece 8 and the state in which the screw 10 is seated on the workpiece 8. That is, the seating torque value PW3 is a torque limit at the time when the seating of the screw 34 on the workpiece 32 is detected. Normally, the seating torque value PW3 is set to be equal to a torque, predetermined in the CPU 4, for deciding whether or not the screw 10 has been seated on the workpiece 8. The seating state of the screw 10 is considered in setting the seating torque value PW3. Finally, at a reversing torque value PW4, a reversing brake is operated to seat the screw 10 on the workpiece 8.

At the start in fastening the screw 10 in the fastening region (b), a fastening-start torque value PW5 is used as a torque to smoothly fasten the screw 10 seated on the workpiece 8. Normally, the fastening-start torque value PW5 is set to about half the seating torque value PW3. The rate (Kgfcm) of increase in torque from the fastening-start torque value PW5 until the target fastening torque (B) is set. For example, supposing that the increase rate of torque is set to 10, then torque increases 10 Kgfcm per second. The greater the increase rate of torque is, the shorter the fastening period of time is. If the increase rate of torque is too great, then the fastening torque overshoots, thus exceeding the target fastening torque (B).

Figure 7:
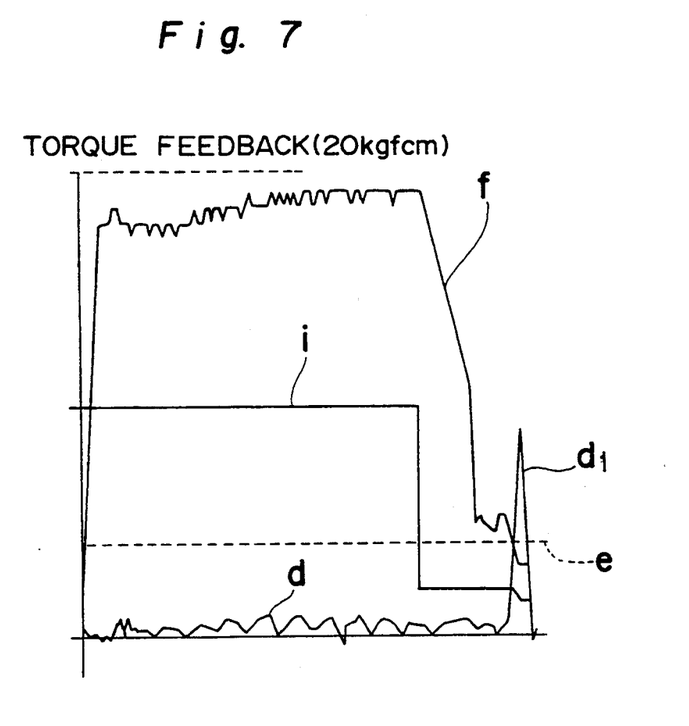
FIG. 7 is a view showing the waveform of a rotational speed and that of torque of the screwing apparatus shown in FIG. 5 with respect to an instructed amplitude of electric current.

FIG. 7 shows the waveform of the rotational speed of the bit 3 and torque to be used in the screwing apparatus shown in FIG. 5 based on the instruction as to the amplitude of electric current issued by the CPU 4. That is, an actual rotational speed (f) of the bit 3 and torque (d) can be obtained according to the instruction as to the amplitude of the electric current issued by the CPU 4.

The motor torque can be controlled when the screw head 7 is moving downward in the vicinity of the workpiece 8 even if the motor torque has an error of approximately 20%, but the rotational speed of the bit 3 cannot be appropriately controlled. When the bit 3 rotates at a high speed in the screwing region (a), the seating surface 7a of the screw head 7 collides with the workpiece 8. As a result, seating torque (d1), shown in FIG. 7, which is an impact torque generated when the rotation of the bit 3 has stopped, rises rapidly, thus exceeding torque (e), predetermined in the CPU 4, for deciding whether or not the screw 10 has been seated on the workpiece 8 and the target fastening torque (B). That is, the fastening operation terminates without fastening the screw 10 at the target fastening torque (B). That is, the torque (d1) in seating depends on the rotational speed of the bit 3 detected before the screw 10 is seated on the workpiece 8 and the amplitude of electric current (torque) flowing through the motor detected when the screw 10 is seated on the workpiece 8 and cannot be controlled stably by merely the control over the electric current flowing through the motor and the voltage to be applied thereto.

SUMMARY OF THE INVENTION

It is accordingly an object of the present invention to provide a screwing apparatus capable of stabilizing torque in seating a screw on a workpiece without providing the screwing apparatus with an encoder or the like.

In accomplishing these and other objects of the present invention, there is provided a screwing apparatus comprising:

a multi-phase motor for rotating a bit, installed on the multi-phase motor, for rotating a screw; and a control device for controlling a rotational speed of the multi-phase motor by calculating a rotational speed of the bit based on commutation signals outputted from sensors installed on the multi-phase motor; and controlling a torque value of the bit by outputting instructions to the motor so that the bit is rotated at a predetermined torque value.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
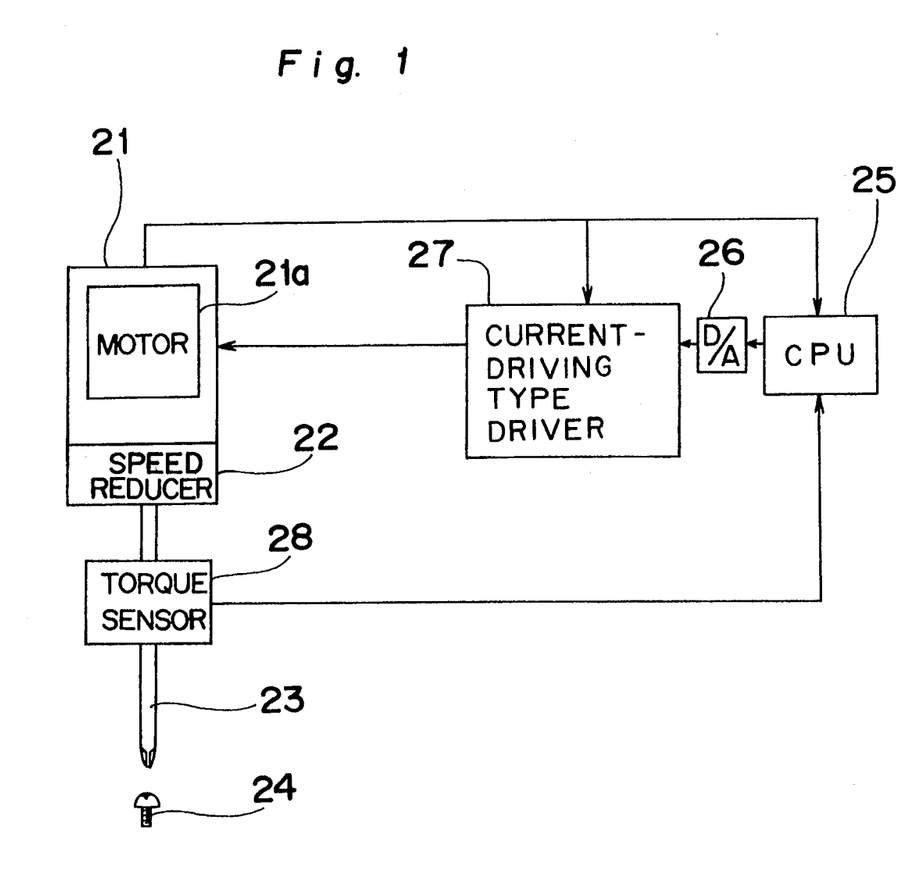
FIG. 1 is a block diagram showing the construction of a screwing apparatus according to an embodiment of the present invention.
Figure 8:
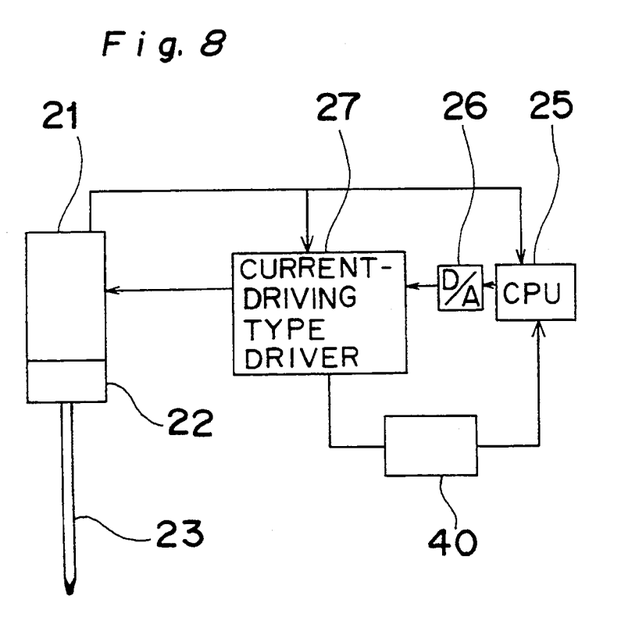
FIG. 8 is a block diagram showing the construction of a screwing apparatus according to another embodiment of the present invention.

There is shown in FIG. 1 a screwing apparatus according to an embodiment of the present invention. Referring to FIG. 1, the construction of the screwing apparatus is described below. The main body 21 of the screwing apparatus, incorporating a three-phase brushless motor 21a, is provided with a speed reducer 2 on the bottom thereof. The rotational speed of the motor 21a is reduced by the reducer 22. The reduced rotational force of the motor 21a is transmitted to a bit 23 so as to rotate a screw 24 installed at the lower end of the bit 23. The motor 21a is connected to a current-driving type driver 27 connected to a central processing unit (CPU) 25 via a D/A converter 26. The current-driving type driver 27 drives the motor 21a depending on the amplitude of electric current (torque) instructed by the CPU 25. The motor 21a of the main body 21 of the screwing apparatus is provided with commutation sensors CS1, CS2, and CS3 (not shown) disposed in the periphery thereof at 120° intervals so as to switch current directions. The sensors CS1 through CS3 are connected to the CPU 25 and the current-driving type driver 27 and switch the direction of electric current to be applied to the motor 21a. Commutation signals outputted from the sensors CS1 through CS3 as three-phase signals of the motor 21a are transmitted to the CPU 25 and the current-driving type driver 27. Based on the levels of the commutation signals, the CPU 25 detects a rotational angle corresponding to the split of one cycle into six equal parts and also detects the rotational speed of the bit 23 by calculating the transition period of time of each commutation signal corresponding to the split of one cycle into six equal parts, as will be described later. In this manner, the CPU 25 controls the rotational speed of the motor 21a, namely, the rotational speed of the bit 23 via the D/A converter 26 and the current-driving type driver 27. The bit 23 is provided with a torque sensor 28 for detecting the rotational torque of the bit 23. The torque sensor 28 is connected to the CPU 25, and then it is assumed that a current value detected by a motor-current detecting device is considered to be a torque value of the motor 21a, thus feeding back the torque value of the bit 23 to the CPU 25. In response to the torque value of the bit 23, the CPU 25 issues an instruction of the torque of the motor 21a to the current-driving type driver 27 via the D/A converter 26, thus controlling the torque of the motor 21a, namely, the torque of the bit 23 so that the bit 23 is rotated at each set torque value. Instead of the torque sensor 28, an electric current detecting device 40 can be provided for detecting an electric current value of the multi-phase motor 21a to obtain the torque value of the bit 23, as shown in FIG. 8. That is, the detected current value is supposed as a torque value of the multi-phase motor 21a to be used.

The operation of the screwing apparatus having the above-described construction is described below. In screwing operation, the seating torque can be approximated by the following equation (1). The seating torque is an impact torque generated as a result of the stop of the rotation of the screw due to the collision of the seating surface of the screw head against the workpiece:

$$\text{Seating torque} = I^*(\omega/t) + PW3 \tag{1}$$

where (I) is inertia seen from the lower end of the bit 23; ($\omega$) is the rotational speed of the bit 23 when the screw is brought into contact with the workpiece; (t) is a period of time required for the seating torque in screw seating to become maximum after the screw is brought into contact with the workpiece; PW3 is a torque value instructed by the CPU 25 when the screw 24 has been seated on the workpiece; and $I^*(\omega/t)$ is the rotational force of the motor 21a. From the equation (1), the seating torque depends on control over the rotational speed of the bit 23 and control over the limit of the amplitude of the electric current. In order to provide a stable torque, it is necessary to control both the rotational speed ($\omega$) of the bit 23 and the seating torque value PW3 instructed by the CPU 25.

Figure 2:
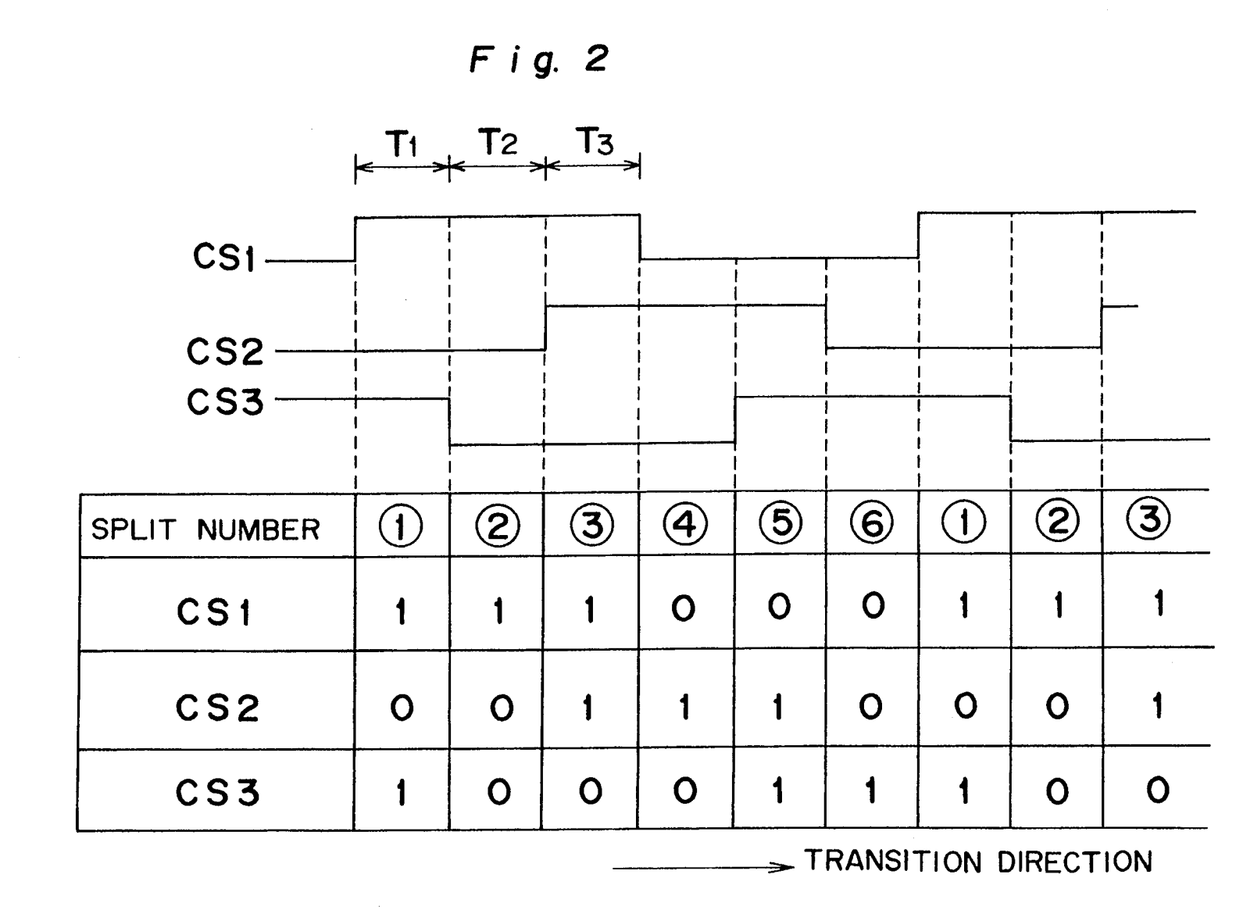
FIG. 2 is a view showing the waveform of commutation signals generated when a motor of the screwing apparatus shown in FIG. 1 rotates forward and the levels of the commutation signals generated when one cycle is equally divided into six parts.

FIG. 2 is a view showing waveforms of the commutation signals outputted from the sensors CS1 through CS3 when the motor 21a is rotating in a forward direction and the levels of the commutation signals generated when one cycle is divided into six equal parts. As shown in FIG. 2, because the motor 21a is a 120° type motor, phases of the waveforms of the commutation signals are shifted by 120° from each other. One cycle can be divided into six equal parts by the level change in the three commutation signals. For example, during the period of time of split number (1), the levels of the commutation signals outputted from the sensors CS1 and CS3 are "1" while the level of the commutation signal outputted from the sensor CS2 is "0". During the period of time of split number (2), the level of the commutation signal outputted from the sensor CS1 is "1" while the levels of the commutation signals outputted from the sensors CS2 and CS2 are "0". Assuming that the transition period of time of each commutation signal between the present state and the next state is (T) (T1=T2=T3 . . . ); and the reduction ratio of the speed reducer 22 is (D), the rotational speed (V) of the bit 23 can be expressed by the following equation (2):

$$\text{Rotational speed } (V) \text{ (rps) of bit} = 6 \times (1/T) \times D \qquad (2)$$

The transition period of time (T) can be counted by utilizing an internal timer (Tc) incorporated in the CPU 25. The rotational speed (V) of the bit 23 can be found by the reduction ratio (D) and the transition period of time (T) found based on the commutation signals by the CPU 25. Assuming that a value counted by the internal timer (Tc) is (N), the rotational speed (rps) of the bit 23 is as follows:

$$6 \times (1/Tc \times N) \times D.$$

The value counted by the internal timer (Tc) becomes small when the rotational speed (V) of the bit 23 is high and thus the influence of a detection error becomes great. Consequently, the manner of counting the state transitions of the commutation signals is changed according to a set speed. For example, when the rotational speed (V) of the bit 23 is as slow as 0 through V1, each transition period of time during the time period indicated by the split numbers (1) through (6) is counted. When the rotational speed (V) of the bit 23 is intermediate, i.e. V1 through V2, every other transition period of time is counted. For example, the time periods indicated by the split numbers (1), (3), and (5) are counted. When the rotational speed (V) is as fast as V2 through V3, every third transition period of time is counted. For example, the time periods indicated by the split numbers (1), (4), and (1) are counted. In this manner, as the rotational speed (V) of the bit 23 is higher, the counting manner is changed, so that detection error can be reduced and a dynamic range can be widened.

As described above, the manner of counting the state transitions of the commutation signals is changed according to a high, intermediate, and low speed of the bit 23. In addition, the rotational speed (V) of the bit 23 in switching over between the increase and decrease of the rotational speed of the bit 23 can be controlled reliably by taking hysteresis into consideration.

Figure 3:
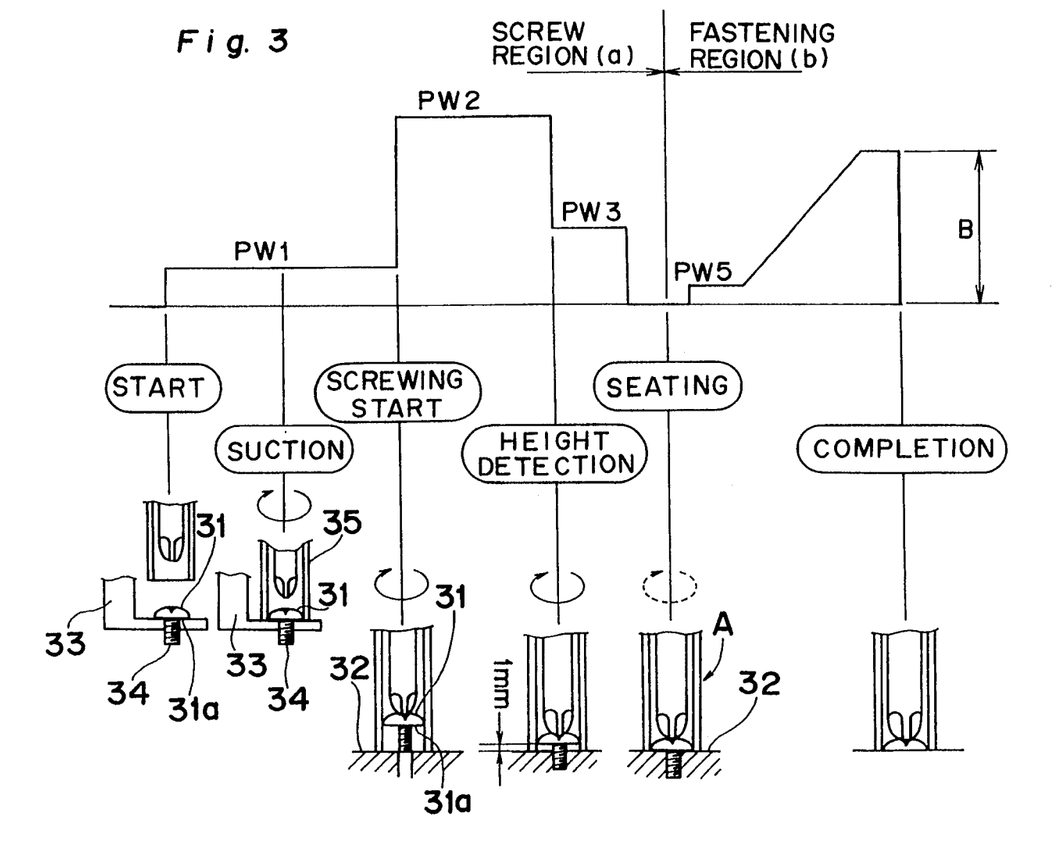
FIG. 3 is a view showing a screwing process of one cycle to be carried out by the screwing apparatus shown in FIG. 1.

FIG. 3 shows the screwing process of one cycle to be performed by the screwing apparatus shown in FIG. 1. The screwing process comprises a screwing region (a) between the start of a screwing operation and a seating state (A) in which a seating surface 31a of a screw head 31 is brought into contact with a workpiece 32; and a fastening region (b) between the seating state (A) and the state in which the screw 34 is fastened at the target fastening torque (B). In a screw-sucking operation to be performed in the screwing region (a), the CPU 25 sets and issues a screw-sucking rotational torque value PW1 as an instruction which is a torque limit set in a low-speed rotation of the motor 21a between the screwing-start state in which the screw 34 is set on a catcher 33 at a predetermined position thereof and the state in which the screw 34 is sucked by a sucking pipe 35 moved downward to cover the screw head 31 set on the catcher 33. Normally, the screw-sucking torque value PW1 is set to about 2 Kgfcm. In the screw-sucking time, the rotational speed of the bit 23 is a speed during a low-speed rotation of the motor 21a between the screwing-start state and the screw sucking state and can be set in a range of from 10%–100% of the maximum speed thereof. Normally, the rotational speed of the bit 23 is set to about 15% of the maximum speed thereof. A screwing rotational torque value PW2 is a torque limit set in a high-speed rotation of the motor 21a during a screwing operation. Normally, the screwing rotational torque value PW2 is set to be greater than the target fastening torque (B) in view of the kind of the screw 34 and the workpiece 32 and screwing state so as to prevent the generation of a motor locking error in the screwing operation. At this time, the screwing rotational torque value PW2 is used, the rotational speed of the bit 23 is a speed in a high-speed rotation of the motor 21a in the screwing state and can be set in a range of from 10%–100% of the maximum speed thereof. Normally, the rotational speed of the bit 23 is set to about 80%–100% of the maximum speed thereof in consideration of the seating state of the screw 34 so as to reduce the screwing time period. A seating torque value PW3 is used between the state in which the screw 34 is disposed at a predetermined height 1 mm above the surface of the workpiece 32 and the state in which the screw 34 is seated on the workpiece 32. That is, the seating torque value PW3 is a torque limit at the time when the seating of the screw 34 on the workpiece 32 is detected. The seating torque value PW3 can be set up to 22 Kgfcm. Normally, the seating torque value PW3 is set to be equal to the seating decision torque, predetermined in the CPU 25, for deciding whether or not the screw 34 has been seated on the workpiece 32. The seating state of the screw 10 is considered in setting the seating torque value PW3. When the bit 23 is rotated at the seating torque value PW3, at this time, the rotational speed thereof is a rotational speed in seating the screw onto the workpiece, and can be set in a range of from 10%–100% of the maximum speed thereof. Normally, the rotational speed of the bit 23 is set to about 15% of the maximum speed thereof in consideration of the seating state of the screw 34 so as to reduce impact force generated when the screw 34 is seated on the workpiece 32. In this manner, the torque of the bit 23 in seating does not greatly exceed the seating decision torque, predetermined in the CPU 25, for deciding whether or not the screw 34 has been seated on the workpiece 32. When the torque of the bit 23 at the time of seating becomes equal to the torque predetermined in the CPU 25, the seating of the screw 34 on the workpiece 32 is detected and then the supply of electric current to the motor 21a is turned off.

At the start in fastening the screw 34 in the fastening region (b), a fastening-start torque value PW5 is used as torque to smoothly fasten the screw 34 seated on the workpiece 32. The fastening-start torque value PW5 can be set up to 22 Kgfcm. Normally, the fastening-start torque value PW5 is set to about half the seating decision torque. The rate (Kgfcm) of increase in torque from the fastening-start torque value PW5 to the target fastening torque (B) is set. For example, if the rate of torque increase is set to 10, then the torque increases 10 Kgfcm per second. The greater the increase rate of torque is, the shorter the fastening period of time is. If the increase rate of torque is too great, the fastening torque overshoots, thus exceeding the target fastening torque (B).

Figure 4:
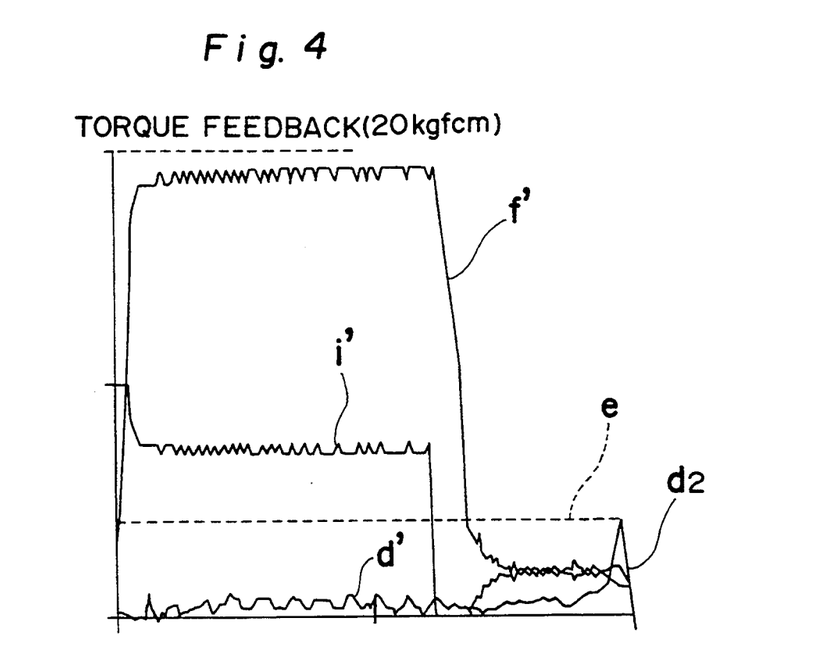
FIG. 4 is a view showing the waveform of a rotational speed and that of torque of the screwing apparatus shown in FIG. 1 with respect to an instructed amplitude of electric current.

FIG. 4 shows the waveform of the rotational speed of the bit 23 and torque to be used in the screwing apparatus shown in FIG. 1, based on the amplitude of the electric current instructed by the CPU 25. That is, an actual rotational speed (f') and torque (d') of the bit 23 can be obtained according to the amplitude of the of electric current (i') instructed by the CPU 25. The CPU 25 detects the rotational speed of the bit 23 based on the levels of the commutation signals and controls the rotational speed of the bit 23 and the limit of the intensity of electric current via the current-driving type driver 27, thus stabilizing the seating torque (d2) which is an impact torque. Therefore, the seating torque (d2) does not rise rapidly and thus does not greatly exceed the seating decision torque c, predetermined in the CPU 25, for deciding whether or not the screw 34 has been seated on the workpiece 32 and then the target fastening torque (B). In this manner, the seating of the screw 34 on the workpiece 32 is detected and then the supply of electric current to the motor 21a is suspended to allow the screwing process to be switched to the fastening process.

According to the conventional art, the motor rotational torque can be controlled by the instruction torque value PW3 but speed signals corresponding to the rotational speed ω of the bit 3 cannot be detected, because the motor is not provided with an encoder. Thus, the rotational speed of the bit 3 cannot be controlled when the screw 10 is seated on the workpiece 8. Unlike the conventional art, according to the present invention, the CPU 25 detects the rotational speed of the bit 23 by utilizing the commutation signals which are three-phase signals outputted from the motor 21a when the screw 34 is seated on the workpiece 32. Therefore, the torque of the bit 23 to be used in the seating of the screw 34 on the workpiece 32 can be reliably controlled without increasing manufacturing cost irrespective of the kind of the screw 34 and the workpiece 32. Thus, the screwing apparatus according to the present invention is capable of controlling the torque of the rotary members in a wider range than the conventional screwing apparatus. In addition, it is unnecessary to provide the screwing apparatus with a reversing brake when the screw 34 is seated on the workpiece 32 and thus the life of the bit 23 can be prolonged. Further, the torque sensor 28 detects the actual torque of the bit 23 and feeds back the detected torque to the CPU 25. Therefore, the screwing apparatus according to the present invention is capable of controlling the torque of the rotary members with higher accuracy than the conventional screwing apparatus.

According to the above construction, the control device controls the rotational speed of the multi-phase motor by calculating the rotational speed of the bit installed on the multi-phase motor based on the commutation signals outputted from the multi-phase motor; and controls the rotational torque of the bit by outputting instructions to the motor. Accordingly, the torque of the bit to be used in the seating of the screw on the workpiece can be reliably controlled. That is, the seating torque is prevented from exceeding the target fastening torque. Therefore, fastening operation is prevented from terminating without fastening the screw at the target fastening torque. In addition, it is unnecessary to provide the screwing apparatus with the encoder or the like which increases manufacturing costs and increase wiring.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A screwing apparatus comprising:
   a multi-phase motor for rotating a bit, installed on the multi-phase motor, for rotating a screw; and
   a control device for controlling a rotational speed of the multi-phase motor by calculating a rotational speed of the bit based on commutation signals outputted from sensors installed on the multi-phase motor; and controlling a torque value of the bit by outputting instructions to the motor so that the bit is rotated at a predetermined torque value.

2. The screwing apparatus as claimed in claim 1, wherein; one cycle is divided into six equal parts by level changes in three commutation signals outputted from three sensors; the motor is connected to the bit via a speed reducer with a reduction ratio D; the control device has a counting device (Tc) for counting transition period of time (T) to get a counted value (N), and the rotational speed of the bit is found by a formula: $6 \times (1/Tc \times N) \times D$.

3. The screwing apparatus as claimed in claim 2, wherein a manner of counting state transitions of the commutation signals is changed according to the rotational speed of the bit.

4. The screwing apparatus as claimed in claim 3, wherein the counting device (Tc) counts each transition period of time (T) during a predetermined time period when the rotational speed of the bit is 0 through V1, every other transition period of time when the rotational speed of the bit is V1 through V2, and every third transition period of time when the rotational speed of the bit is V2 through V3.

5. The screwing apparatus as claimed in claim 3, wherein hysteresis is taken into consideration in the rotational speed of the bit in switching over between the increase and decrease of the rotational speed of the bit.

6. The screwing apparatus as claimed in claim 4, wherein hysteresis is taken into consideration in the rotational speed of the bit in switching over between the increase and decrease of the rotational speed of the bit.

7. The screwing apparatus as claimed in claim 1, further comprising a torque detecting device, connected to the control device, for detecting the torque value of the bit.

8. The screwing apparatus as claimed in claim 1, further comprising an electric current detecting device for detecting an electric current value of the multi-phase motor to obtain the torque value of the bit.

* * * * *